Feb. 23, 1926.
G. J. GLAHN
1,574,243
VEHICLE BUMPER
Filed Sept. 23, 1925 2 Sheets-Sheet 1
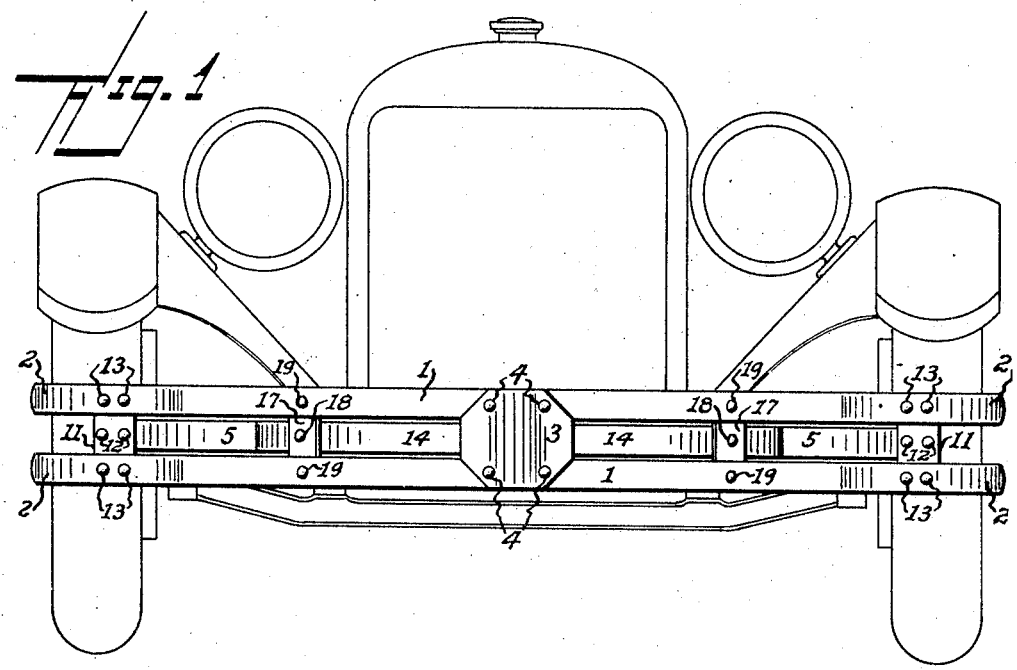
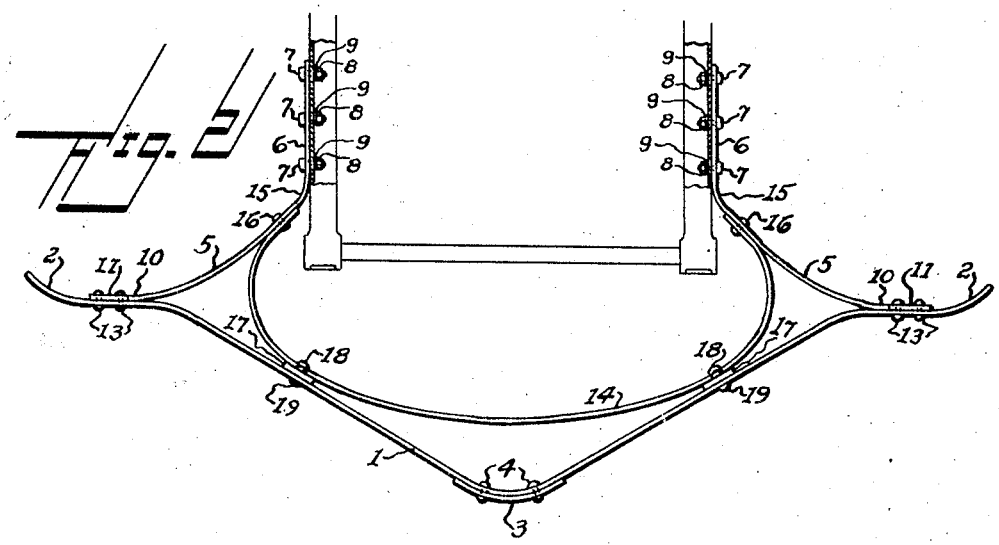
George J. Glahn
INVENTOR

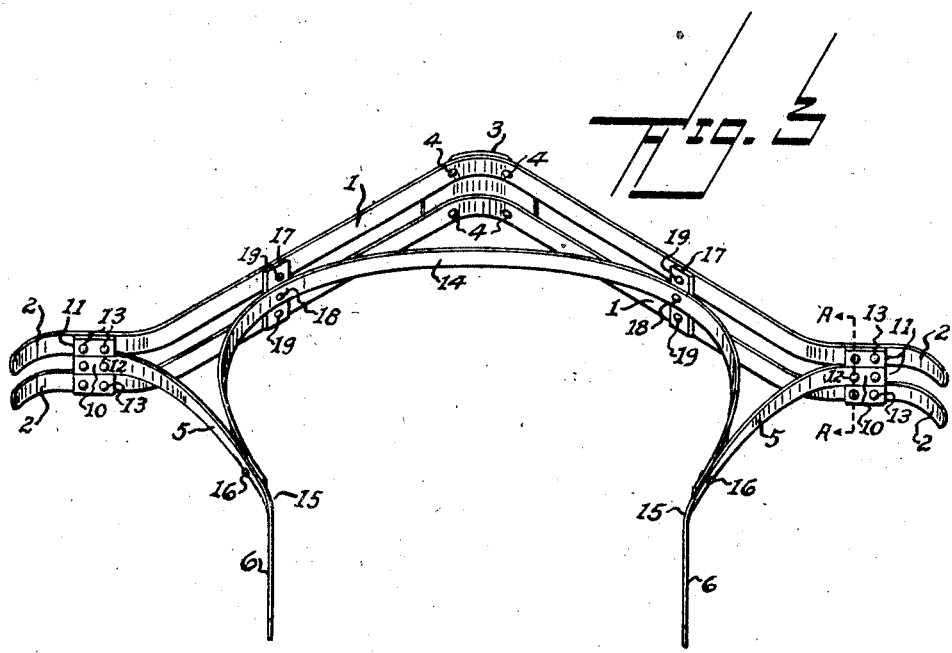
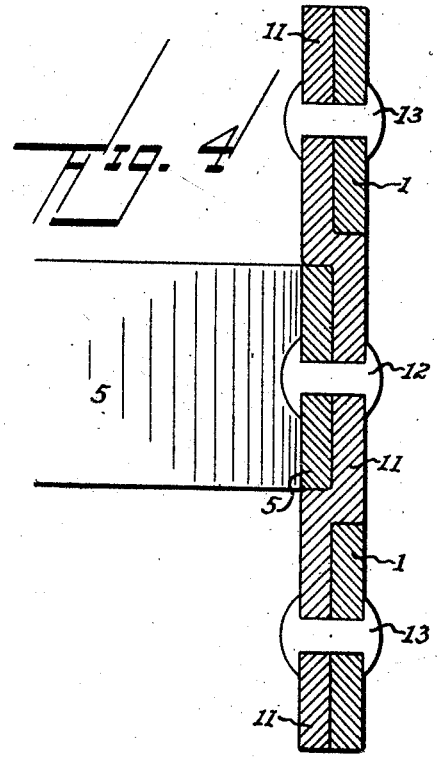

Patented Feb. 23, 1926.

1,574,243

UNITED STATES PATENT OFFICE.

GEORGE J. GLAHN, OF OWENSBORO, KENTUCKY.

VEHICLE BUMPER.

Application filed September 23, 1925. Serial No. 58,115.

*To all whom it may concern:*

Be it known that I, GEORGE J. GLAHN, a citizen of the United States, residing at Owensboro, in the county of Daviess and State of Kentucky, have invented certain new and useful Improvements in Vehicle Bumpers, of which the following is a specification.

My invention relates to improvements in vehicle bumpers, and provides a device of this character embodying an entirely new design in appearance and construction. The principal object of the invention is that owing to the particular V-shape of the impact surface it becomes a safety device as well as serving as an efficient bumper for motor vehicles. It is a well known fact that a V shape impact surface will naturally cause the person or object struck to glide off to the side, thus relieving the solid impact which does result from practically all types of bumpers at present in use, and which usually embody straight-across the front, impact surfaces. Some types of bumpers have their front portions somewhat curved, but this is very ineffective in accomplishing my desired results. The normal position of my bumper is somewhat lower than that of the ordinary types, and at both sides it is well extended in front of the wheels, forming efficient guards, and in striking a person at high speed the device would become more effective, as the more forceful the impact the more speedily the person or object struck would be discharged to the side of the machine and at the same time protecting them from being caught underneath the wheels.

One of the advantages of the invention is that the principal rails are spaced somewhat further apart than common, thereby producing an impact surface of greater breadth which is more effective in protecting a person and also in striking solid objects that may happen to be within the path of the vehicle.

A decided advantage of the V type bumper is that should the vehicle unavoidedly collide with a tree, telephone pole, fence post etc., and the impact occurs upon any portion of the angular sides, which in all probability will be the result in nearly every instance, the front end of the vehicle will naturally glide to one side or the other thus relieving the sudden impact that would occur from the use of the ordinary square bumpers and thereby preventing, probably, considerable damage to the machine that may have otherwise occurred. It is well understood that the V shape rails of my bumper would withstand a far greater and more forceful impact than other bumpers, and for this reason possesses much greater strength and durability, which is a considerable advantage and is badly needed for the general protection to motor vehicles from this source. While my bumper is very substantially constructed and rigid it is arranged so as to form a complete cushion of resiliency, and the shock from an impact upon any part thereof would be greatly absorbed, hence it will be readily seen the improvement of the device meets the requirements of the bumper in a more scientific manner than has been heretofore accomplished.

In addition to the advantages just stated the V shaped bumper presents a more beautiful appearance and would add much to the attraction of the vehicle. It may be finished in enamel of the desired color with nickel plated trimmings or it may be plated over the entire surface.

While I have illustrated two principal rails in the drawings, three or four or any suitable number may be employed without affecting the principle shown. Besides the numerous advantages already described, this bumper is extremely simple in design and construction, and for this reason it may be manufactured so as to be sold upon the market at a very reasonable price, or in other words no higher than that of the ordinary types.

The invention comprises further advantages as will be pointed out in the following description, and as I have set forth one complete form of my device I do not wish to be limited to the precise form of the details of construction, as in the practical development of same for the market it may become necessary to make certain minor changes, any or all of which will fall within the scope of what is herewith described and claimed.

With reference to the drawings:

Figure 1 is a direct front elevation of my device and showing how it will appear when connected to an automobile, a front view of which is clearly shown.

Figure 2 is a plan view of the bumper and showing the manner of connection to the chassis, part of the latter being in section.

Figure 3 is an isometric view of the bumper alone.

Figure 4 is an enlarged transverse section of the bumper taken through the line, A—A of Fig. 3.

The invention comprises properly, two V shape metal rails, designated by the numeral 1, and curved ends 2 forming wheel guards as shown. Said rails are substantially connected at their forward portions by the metal plate 3, with holes through said plate and rails to accommodate the rivets 4, said plate providing a convenient place for the owner's monogram, either by stamping same into the metal or by painting. It also serves as a very rigid connection of the rails and a reinforcement at this location, which is most important. Supporting brackets 5 have straight portions 6 which are connected to the automobile chassis by bolts 7, which have nuts 8 and lock-washers 9, and pass through portions 6 of members 5 and through alined holes in the chassis for said bolts, see Fig. 2. While three bolts are shown to be the manner of connection of my device to the automobile chassis, rivets may be used instead thereof if desired. Brackets 5 also having straight portions 10, which fit precisely into depressions for same in the plates 11, and are connected thereto by rivets 12, said plates being secured to the rails 1 by rivets 13, which will be clearly seen by referring to Figure 4. Plates 11 not only rigidly secure the ends of the rails 1 together, but owing to their particular shape are especially rendered rigid and make it utterly impossible for the brackets 5 to become loosened or disengaged and make a most substantial and desirable supporting element for the main part of the bumper. In order to reinforce the entire bumper rail 14 is provided and curved in a manner so as not to affect the resiliency of the bumper, yet greatly adding to its strength and rendering it more rigid to all kinds of impacts. It also strengthens brackets 5 at the bends in same, shown at 15. Both ends of rail 14 are connected to brackets 5 by rivets 16, through holes in both members for same for said rivets, said rail also being connected to plates 17 by rivets 18, said plates being secured to the rails 1 by rivets 19, through holes in members 1, and 14 and 17 for the accommodation of said rivets. All rails and brackets as described are composed of a high grade spring steel, suitable for this purpose.

It may be added that this bumper may be made into various sizes and proportions which may be readily applied to any passenger motor vehicle or truck, and it also could be attached to the rear of the vehicle, but would be more advantageously used when attached to the front portion as described.

Having thus described my invention, what I claim as new is:

1. In a vehicle bumper as described, comprising V shape impact rails, a name-plate for the nose connection thereof, right and left supporting brackets, with straight ends, adapted to be conected to an automobile chassis, and means for connecting said brackets to the impact rails comprising vertically arranged plates with central depressions in same to receive opposite ends of said supporting brackets respectively, and means for connecting said brackets with said plates, also means for connecting said plates with said impact rails.

2. In a vehicle bumper as described, comprising V shape impact rails, a name-plate, right and left supporting brackets, vertically extending plates for connecting said brackets to said impact rails, a reinforcing rail, having both ends connected to the supporting brackets respectively, and means of connection thereof, including vertically arranged plates connected to the impact rails, said reinforcing rail being connected to the last-named vertically arranged plates, and means for connecting said reinforcing rail with said plates In testimony whereof I affix my signature.

GEORGE J. GLAHN.